(12) United States Patent
Forster (10) Patent No.: US 11,900,200 B2
(45) Date of Patent: Feb. 13, 2024

(54) DUAL-MODE RFID DEVICES

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 17/787,633

(22) PCT Filed: Dec. 28, 2020

(86) PCT No.: PCT/US2020/067126
§ 371 (c)(1),
(2) Date: Jun. 21, 2022

(87) PCT Pub. No.: WO2021/134059
PCT Pub. Date: Jul. 1, 2021

(65) Prior Publication Data
US 2022/0414417 A1    Dec. 29, 2022

Related U.S. Application Data

(60) Provisional application No. 62/954,455, filed on Dec. 28, 2019.

(51) Int. Cl.
*G06K 19/077* (2006.01)
*G06K 19/07* (2006.01)

(52) U.S. Cl.
CPC ... *G06K 19/07773* (2013.01); *G06K 19/0723* (2013.01)

(58) Field of Classification Search
CPC .................... G06K 19/07773; G06K 19/0723
(Continued)

(56) References Cited

U.S. PATENT DOCUMENTS 9,342,775 B2   5/2016  Forster
9,871,294 B2   1/2018  Forster
(Continued)

FOREIGN PATENT DOCUMENTS

WO    2018/126137    7/2018

OTHER PUBLICATIONS

International Preliminary Report on Patentability dated Jun. 28, 2022 issued in IA No. PCT/US2020/067126 filed Dec. 28, 2020.
(Continued)

*Primary Examiner* — Allyson N Trail (57) ABSTRACT

Dual-mode RFID devices are provided with an integrated dual-mode RFID strap including either a UHF/HF dual-mode RFID chip or the combination of a UHF RFID chip and an HF RFID chip. An HF antenna and a UHF antenna are both coupled to the integrated dual-mode RFID strap, with the UHF antenna being formed by an approach other than etching, such as a cutting or printing operation, thereby reducing the cost to manufacture the device. If a pair of chips is employed, one of the chips may have a greater thickness than the other chip, which allows for the thicker chip to be incorporated into the device after the thinner chip without requiring a minimum separation between the two chips due to the size of a thermode used to secure the chips. Additionally, the first chip may be tested before securing the second chip, thereby limiting the cost of a rejected device.

23 Claims, 5 Drawing Sheets

(58) Field of Classification Search
USPC .......................................................... 235/492
See application file for complete search history.

(56) References Cited

U.S. PATENT DOCUMENTS

| | | | |
|---|---|---|---|
| 10,262,167 B2 | 4/2019 | Nyalamadugu et al. | |
| 10,679,115 B2 | 6/2020 | Huhtasalo | |
| 11,423,278 B1* | 8/2022 | Koepp | H01L 21/76802 |
| 2006/0044769 A1 | 3/2006 | Forster et al. | |
| 2010/0225448 A1* | 9/2010 | Arguin | G08B 13/242 |
| | | | 340/10.1 |
| 2015/0227832 A1* | 8/2015 | Diorio | G06K 19/07756 |
| | | | 29/601 |
| 2015/0294210 A1* | 10/2015 | Martinez de Velasco Cortina | G07B 15/063 |
| | | | 235/492 |
| 2015/0328871 A1* | 11/2015 | de Castro | B41M 3/12 |
| | | | 705/310 |
| 2015/0342031 A1* | 11/2015 | Song | H01Q 17/00 |
| | | | 29/464 |
| 2016/0180213 A1 | 6/2016 | Forster | |
| 2016/0203395 A1* | 7/2016 | Huhtasalo | G06K 19/0723 |
| | | | 235/492 |
| 2016/0342883 A1* | 11/2016 | Huhtasalo | G06K 19/07794 |
| 2019/0385039 A1* | 12/2019 | Dyche | G06K 19/0723 |
| 2020/0134408 A1* | 4/2020 | Law | B29C 66/83411 |
| 2020/0175497 A1* | 6/2020 | Nyalamadugu | G06Q 20/363 |
| 2020/0285928 A1* | 9/2020 | Carrender | H04W 4/40 |
| 2020/0302764 A1 | 9/2020 | Forster | |
| 2021/0027553 A1* | 1/2021 | Beenken | B60R 13/10 |
| 2021/0166100 A1* | 6/2021 | Bühler | G06K 19/027 |

OTHER PUBLICATIONS

Invitation to Pay Additional Fees dated Apr. 7, 2021 issued in IA No. PCT/US2020/067126 filed Dec. 28, 2020.
International Search Report and Written Opinion dated May 31, 2021 issued in IA No. PCT/US2020/067126 filed Dec. 28, 2020.

* cited by examiner

DUAL-MODE RFID DEVICES

CROSS-REFERENCE TO RELATED APPLICATION

The present application is 371 of International Application No. PCT/US2020/067126, which was published in English on Jul. 1, 2021, and claims the benefit of U.S. Provisional Patent Application No. 62/954,455 filed Dec. 28, 2019, both of which are incorporated herein by reference in their entireties.

FIELD

The present subject matter relates to dual-mode radio frequency identification ("RFID") devices. More particularly, the present subject matter relates to low-cost approaches to manufacturing dual-mode RFID devices.

BACKGROUND

RFID devices contain an integrated circuit or chip and an antenna and are widely used to associate an object with a unique identification code. The antenna sends and receives signals that are transmitted at a particular frequency or within a particular frequency band. For example, an RFID device may be configured to send and receive signals within a high frequency ("HF") band (i.e., signals having a frequency in the range of approximately 3 MHz to 30 MHz) or within an ultra-high frequency ("UHF") band (i.e., signals having a frequency in the range of approximately 300 MHz to 3,000 MHz). More particularly, a HF RFID device tends to operate at a frequency at or about 13.56 MHz, while a UHF RFID device tends to operate at a frequency in a range of approximately 866 MHz to 915 MHz (or 902 MHz to 928 MHz in North America).

In many applications, it is desirable to employ an RFID device that operates in multiple frequency bands, such as HF and UHF. U.S. Pat. No. 9,871,294, which is hereby incorporated herein by reference, describes an exemplary dual-frequency RFID device. A dual-frequency RFID device may be variously configured, such as employing a dual-mode RFID chip electrically coupled to a pair of antennas configured to send and receive signals in different frequency bands according to one approach. Alternatively, a dual-frequency RFID device includes a first chip/antenna pair and a second chip/antenna pair, with the first and second pairs operating in different frequency bands.

HF antennas, due to their small geometries and need for a connection either between the inner and outer of a coil (a bridge) or interconnection through a substrate (crimps) to a second coil antenna on the other side of the substrate, are frequently made using an etching process. UHF straps (containing an RFID chip and a pair of conductive pads configured to be electrically coupled to a UHF antenna) are also commonly etched, for similar reasons. However, while etching techniques have proven to be effective in creating RFID devices, they may be expensive compared to other approaches.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

Dual-mode RFID devices containing an integrated RFID strap having dual-mode capability are described herein. In some embodiments, the integrated dual-mode RFID strap is configured as a reactive strap and contains a conductive ring and a HF antenna coupled to a RFID chip assembly. In some embodiments, the integrated dual-mode RFID strap is configured to couple with a UHF antenna without physical contact between the UHF antenna and the integrated dual-mode RFID strap.

In some embodiments, the integrated dual-mode RFID strap containing the conductive ring and the HF antenna described above, coupled by the RFID chip assembly, is on a single substrate.

In some embodiments, the integrated dual-mode RFID strap configured as a reactive strap as described above couples magnetically, conductively, and/or capacitively with the UHF antenna.

In some embodiments, the RFID chip assembly of the integrated dual-mode RFID strap contains a RFID coupling strap and a dual mode RFID chip. In one embodiment, the dual mode RFID chip contains a UHF/HF dual RFID chip. In another embodiment, the dual mode RFID chip contains a combination of a UHF RFID chip and a HF RFID chip, each individually disposed on a RFID coupling strap.

In some embodiments, the integrated dual-mode RFID strap contains an HF antenna and a conductive ring affixed to the RFID coupling strap by means of an adhesive material including a pressure sensitive adhesive.

Methods for manufacturing a dual-mode RFID device are also described herein. In some embodiments, the methods include providing an integrated dual-mode RFID strap having an RFID chip assembly containing a UHF/HF dual-mode RFID chip or the combination of a UHF RFID chip and an HF RFID chip. In some embodiments, the integrated dual-mode RFID strap also contains a HF antenna and a conductive ring affixed, attached, or coupled to the RFID chip assembly. In some embodiments, the HF antenna and the conductive ring are coupled to the RFID chip assembly at its opposing ends. In one embodiment, the conductive ring is a UHF loop. In some embodiments, the presence of the conductive ring as part of the integrated dual-mode RFID strap enables coupling of the strap with the UHF antenna. In some embodiments, the UHF antenna is formed without being etched.

In some embodiments, the method for manufacturing a dual-mode RFID device including a RFID chip assembly thereof involves securing a first RFID chip to a structure of a dual-mode RFID device using a thermode to apply heat and pressure between the first RFID chip and the structure. In some embodiments, a second RFID chip is then secured to the structure using the thermode, with at least a portion of the first RFID chip being positioned between the thermode and the structure.

In some embodiments, the method for manufacturing a dual-mode RFID device including a RFID chip assembly thereof involves securing a first RFID chip to a structure of a dual-mode RFID device and then subjecting the first RFID chip to a first test. If the first RFID chip fails the first test, then the dual-mode RFID device is rejected. If the first RFID chip passes the first test, a second RFID chip is secured to the structure, followed by the second RFID chip being subjected to a second test. If the second RFID chip fails the second test, then the dual-mode RFID device is rejected;

otherwise, if the second RFID chip passes the second test, then the dual-mode RFID device is accepted.

DETAILED DESCRIPTION

The embodiments disclosed herein are exemplary only, and the subject matter described herein may be embodied in various forms. Therefore, specific details disclosed herein are not to be interpreted as limiting the subject matter as defined in the accompanying claims.

Figure 1:
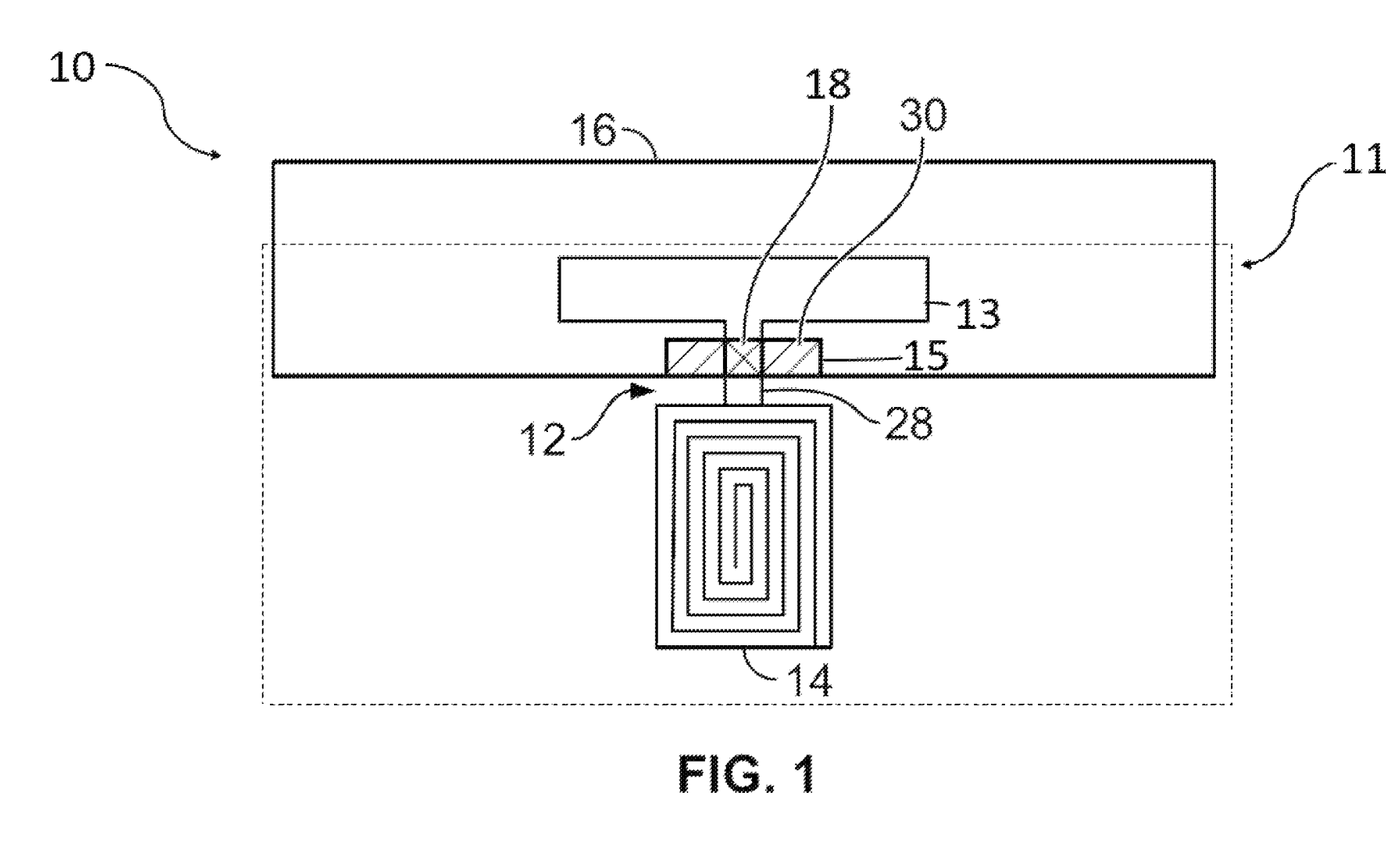
FIG. 1 is a schematic view of an exemplary dual-mode RFID device according to an aspect of the present disclosure.

FIG. 1 shows a dual-mode RFID device 10 (e.g., an RFID tag or label) according to an aspect of the present disclosure. The dual-mode RFID device 10 includes an integrated dual-mode RFID strap 11 configured to be coupled with a UHF antenna 16. The integrated dual-mode RFID strap 11 contains a conductive ring 13 and an HF antenna 14 coupled to a RFID chip assembly 12. In some embodiments, the integrated dual-mode RFID strap 11 enables coupling between the HF antenna 14 and the UHF antenna 16 via the conductive ring 13. In the present embodiment, the conductive ring 13 is a UHF loop coupled to the RFID chip assembly 12. However, other conductive structures can be used.

Figure 2:
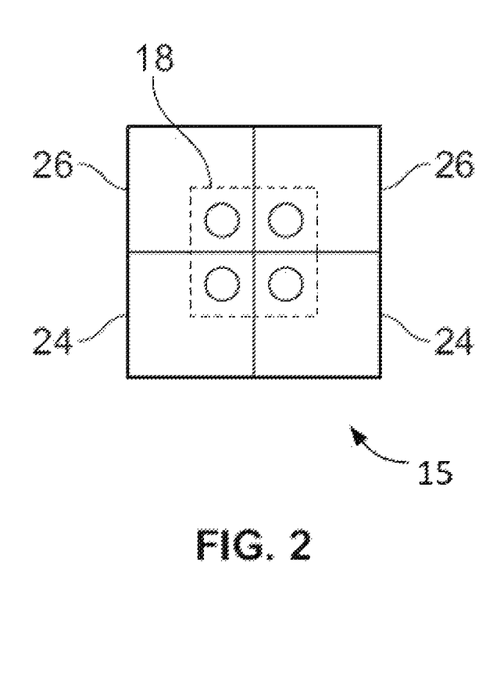
FIG. 2 is a schematic view of a first exemplary embodiment of an RFID strap of the dual-mode RFID device of FIG. 1, employing a UHF/HF dual-mode RFID chip.

FIG. 2 shows a RFID chip assembly 12 containing a RFID coupling strap 15, conductive pads 30 and one or more RFID chips. The RFID chip assembly 12 is coupled on one side to the HF antenna 14 and on the other side to the conductive ring 13. Particularly, the HF antenna 14 and the conductive ring 13 are attached to the RFID coupling strap 15. In one embodiment, an adhesive material such as a pressure sensitive adhesive is used to couple, affix, or attach the HF antenna 14 and the conductive ring 13 to the RFID coupling strap 15. The HF antenna 14, the conductive ring 13, and the RFID strap assembly 12 coupling both the HF antenna 14 and the conductive ring 13 are incorporated in a common substrate, with the integrated dual-mode RFID strap 11 serving as a "combo strap" that is separate from the UHF antenna 16.

Figure 3:
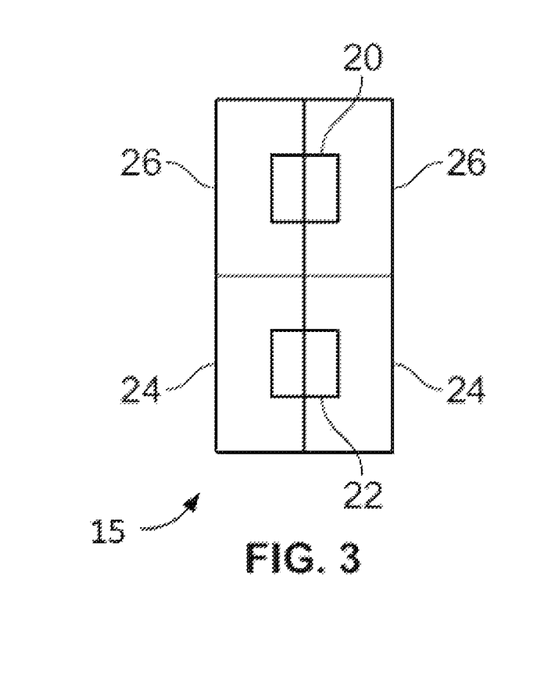
FIG. 3 is a schematic view of a second exemplary embodiment of an RFID strap of the dual-mode RFID device of FIG. 1, employing the combination of a UHF RFID chip and an HF RFID chip.

The one or more RFID chips of the RFID chip assembly 12 includes either a single UHF/HF dual-mode RFID chip 18 (FIG. 2) or the combination of a UHF RFID chip 20 and an HF RFID chip 22 (FIG. 3). Many aspects of the present disclosure may be employed with the RFID coupling strap 15 having either one or two RFID chips. However, certain aspects of the present disclosure are particular to the RFID coupling strap 15 having a pair of RFID chips 20 and 22, as will be described in greater detail herein.

Regardless of the particular configuration of the RFID chip assembly 12, the integrated dual-mode RFID strap 11 is configured for coupling to an HF antenna 14 and a UHF antenna 16. FIGS. 2 and 3 show RFID coupling straps 15 having a pair of HF connections 24 (associated with either the UHF/HF dual-mode RFID chip 18 (FIG. 2) or the HF RFID chip 22 (FIG. 3)) and a pair of UHF connections 26 (associated with either the UHF/HF dual-mode RFID chip 18 (FIG. 2) or the UHF RFID chip 20 (FIG. 3)).

The nature and configuration of the HF connections 24 and the UHF connections 26 may vary, depending on the nature and configuration of the associated antennas. In the embodiment of FIG. 1, the HF antenna 14 is configured as a coil, in which case the HF connections 24 may be configured as conductive leads 28 (as shown in FIG. 1) that may be coupled to the coil. In the embodiment of FIG. 1, the UHF antenna 16 is configured as a slotted-loop antenna, in which case the UHF connections 26 may be configured as conductive pads 30 (as shown in FIG. 1) that may be coupled to the slotted-loop antenna.

Figure 4:
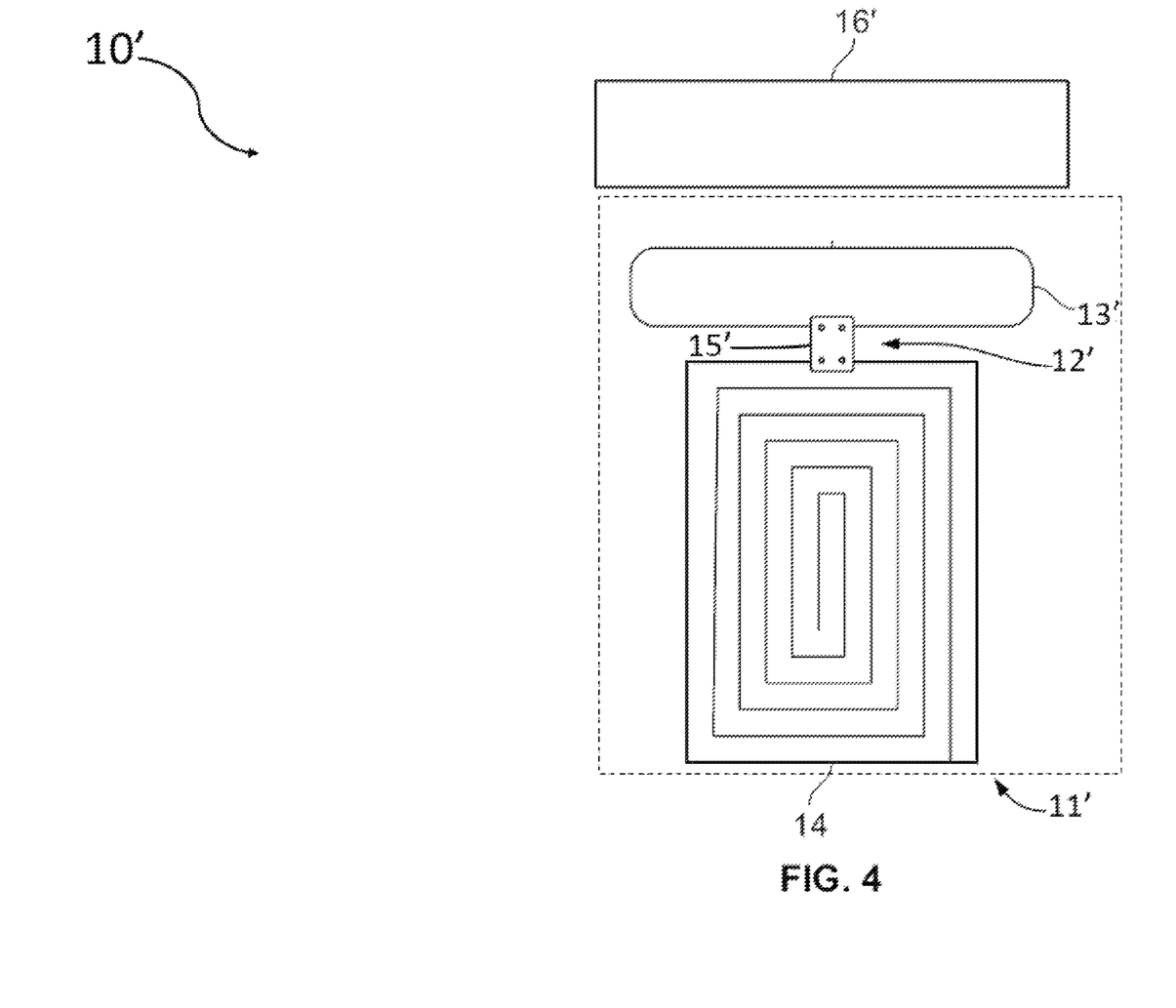
FIG. 4 is a schematic view of another embodiment of an exemplary dual-mode RFID device according to an aspect of the present disclosure.

As noted above, the nature and configuration of the antenna connections of the RFID coupling strap 15 may vary, depending on the nature and configuration of the associated antennas. By way of example, FIG. 4 illustrates a dual-mode RFID device 10' having a differently configured UHF antenna 16'. In the embodiment of FIG. 4, rather than the UHF antenna 16' being configured to be connected to the RFID coupling strap 15' at conductive pads, the UHF antenna 16' is instead configured to be coupled to the RFID coupling strap 15' without physical contact between the UHF antenna 16' and the RFID coupling strap 15'. In other words, the RFID coupling strap 15' is configured as a reactive strap, with the conductive ring 13' coupled to the RFID chip assembly to effectively couple the UHF antenna 16' (which may be configured as a dipole antenna) to the integrated dual-mode RFID strap 11'. In the present embodiment, the integrated dual-mode RFID strap 11' is magnetically coupled to the UHF antenna 16'.

Figure 5:
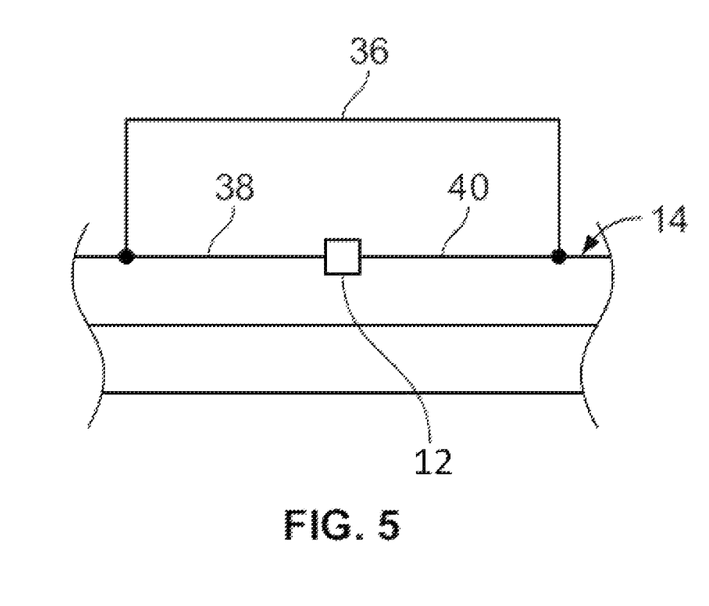
FIG. 5 is a detail view of a portion of an alternative embodiment of the dual-mode RFID device of FIG. 4, in which a portion of an HF antenna of the dual-mode RFID device defines a portion of a conductive ring of the dual-mode RFID device.

While FIG. 4 shows the conductive ring 13' as being entirely separate from the HF antenna 14 (which is shown as being configured as a coil), but it is within the scope of the present disclosure for an HF antenna to define a portion of a conductive ring, as shown in FIG. 5. In the embodiment of FIG. 5, the HF antenna 14 is configured as a coil that is coupled to the RFID chip assembly 12. A conductor 36 has first and second ends that are coupled to the HF antenna 14 at opposing sides of the RFID chip assembly 12. By such a configuration, a conductive ring is formed by the conductor 36 and the portions 38 and 40 of the HF antenna 14 extending between the RFID chip assembly 12 and the locations at which the conductor 36 is joined to the HF antenna 14. The conductive ring/conductor 36 resonates with the RFID chip assembly 12 at a desired high frequency (e.g., 900 MHz), but the voltage associated with the HF operation is shorter around the RFID chip assembly 12 by the low inductance bridge.

Regardless of the particular configuration of the dual-mode RFID device 10, 10', the UHF antenna 16, 16' is formed using an approach other than etching, which is relatively expensive and may be slower than other approaches. In one embodiment, the UHF antenna 16, 16' is formed via a cutting operation, such as die-cutting (e.g., from a paper/foil structure) and/or laser-cutting. In another embodiment, the UHF antenna 16, 16' is formed via a printing operation. It should be understood that cutting and printing are exemplary lower cost approaches to forming the UHF antenna 16, 16', rather than being an exhaustive list of possible approaches. Instead, it should be understood that the present disclosure encompasses any method of forming a UHF antenna that is less expensive than the cost of forming the same UHF antenna via an etching operation.

Once formed, the UHF antenna 16, 16' may then be coupled to the integrated dual-mode RFID strap 11, 11' according to any suitable approach, which may include coupling the UHF antenna 16, 16' to the RFID coupling strap 15, 15' using an adhesive material, such as a pressure-sensitive adhesive, which allows the UHF antenna 16, 16' to be rapidly connected to the RFID strap 15, 15'. In the case of conductive pads 30 (as in FIG. 1), a thin layer of adhesive is applied between the conductive pads 30 and the UHF antenna 16, with the UHF antenna 16 being coupled to the conductive pads 30 via capacitance.

One consideration when employing an RFID chip assembly 12 having a UHF RFID chip 20 and an HF RFID chip 22 is the separation between the two chips 20 and 22. According to one conventional approach to incorporating a pair of RFID chips into a dual-mode RFID device, a chip attach system transfers one chip from a wafer at a time, such that attaching two chips requires two passes through the system. As part of the chip attach process, an anisotropic conductive paste is provided under the chip, with the chip being pushed into the paste and heated by a thermode, which cures the adhesive. If the separation between the two chips is less than the size of the portion of the thermode used to secure the second chip, the thermode will stop at the attached height of the first chip, which may prevent proper bonding of the second chip to a structure of the RFID device.

Figure 6:
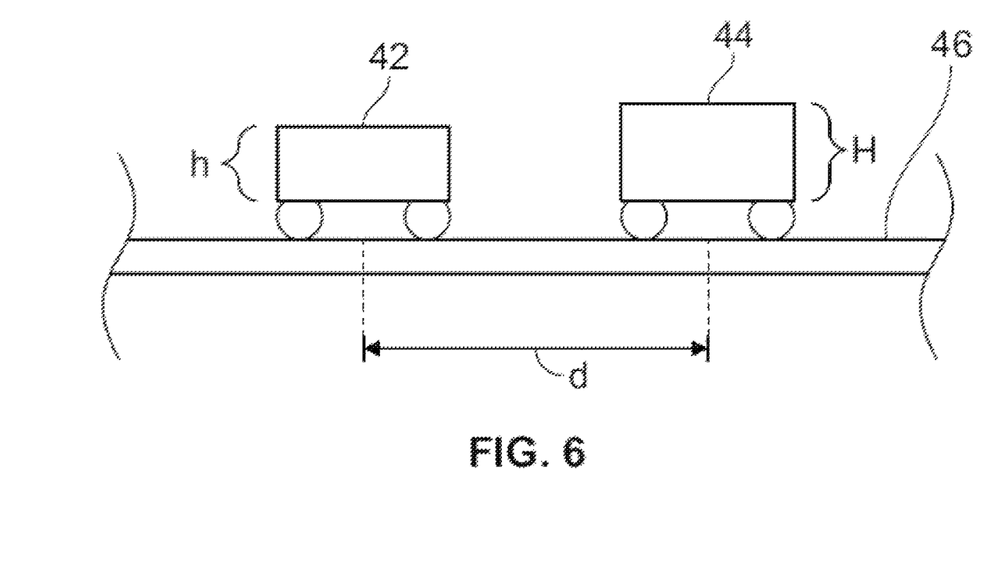
FIG. 6 is a schematic view of an exemplary embodiment of a pair of RFID chips that may be incorporated into a dual-mode RFID device according to an aspect of the present disclosure.

Therefore, in some embodiments, the limitation of the conventional chip attach process described above may be overcome by providing first and second chips 42 and 44 having different heights, as shown in FIG. 6. The second chip 44 has a height "H" that is greater than the height "h" of the first chip 42, such that the first chip 42 will not interfere with a thermode attempting to secure the second chip 44 to a structure 46 of a dual-mode RFID device. By such an arrangement, the separation "d" between the two chips 42 and 44 may be less than the size of the portion of the thermode used to secure the second chip 44, in which case at least a portion of the first chip 42 will be positioned between the thermode and the structure 46 of the dual-mode RFID device when securing the second chip 44. More closely positioning the two RFID chips 42 and 44 allows for creation of a smaller dual-mode RFID strap, which may reduce the cost of the RFID strap.

The heights "h" and "H" of the two chips 42 and 44 may vary without departing from the scope of the present disclosure, provided that the second chip 44 has a greater height than the first chip 42. In one exemplary embodiment, the first chip 42 has a height "h" of approximately 75 μm, while the second chip 44 has a height "H" of approximately 125 μm. The second chip 44 may be configured to have a height "H" that is a particular percentage greater than the height "h" of the first chip 42, such as at least 10% greater or at least 25% greater or at least 50% greater, for example. In yet another embodiment, the second chip 44 may be configured to have a height "H" that is a particular amount greater than the height "h" of the first chip 42, such as being at least 25 μm greater than the height "h" of the first chip 42 or at least 50 μm greater than the height "h" of the first chip 42. The particular height difference between the two chips 42 and 44 may be selected based on any of a number of factors, such as the configuration of the thermode system (e.g., the amount of heat and pressure to be applied) and the nature of the adhesive being employed. It should be understood that this aspect of the present disclosure is not limited to use with a dual-mode RFID device having a UHF antenna formed according to any particular approach, but may be more widely employed with any dual-mode RFID device having a pair of RFID chips.

In some embodiments, a sequential test method may be employed to reduce costs associated with chip attach failures or faulty chips for dual-mode RFID devices having a pair of RFID chips. The first chip is attached to a structure of a dual-mode RFID device according to any suitable approach. The first chip is then subjected to a first test to determine whether it is faulty in any way (e.g., due to a chip attach failure or due to the chip itself being faulty). If the first chip fails the test, then the RFID device is rejected as being defective without securing the second chip (which would unnecessarily increase the cost associated with the failure of the first chip). On the other hand, if the first chip passes the first test, then the second chip may be secured to the structure of the dual-mode RFID device according to any suitable approach. The second chip is then subjected to a second test to determine whether it is faulty in any way. If the second chip fails the test, then the RFID is rejected as being defective. Otherwise, if the second chip passes the test, then the dual-mode RFID device may be accepted.

It is possible for the first chip to become damaged in the course of securing the second chip to the structure of the dual-mode RFID device. Accordingly, it may be advantageous to not only test the second chip after securing it, but to also subject the first chip to a third test (which is the second test applied to the first chip). If the first chip fails the third test and/or if the second chip fails the second test, then the dual-mode RFID device is rejected. On the other hand, if the second chip passes the second test and the first chip passes the third test, then the dual-mode RFID device is accepted. It should be understood that the nature of the tests may vary without departing from the scope of the present disclosure. This may include the first chip being subjected to either the same test twice or to a different test before and after the second chip has been secured (in embodiments in which the first chip is tested twice).

If the chips are being incorporated into an integrated dual-mode RFID strap (e.g., one of the type described herein), the second and third tests may be carried out on the strap or one or both of the tests may be carried out after the strap has been coupled to an antenna. This may include one or both of the chips being tested between attachment of the second chip and coupling to the antenna and after coupling to the antenna.

The present configuration of the integrated dual-mode RFID strap enables easy manufacturing of numerous RFID tags with varying configurations while using a common integrated dual-mode RFID strap. Forming the UHF antenna using die-cutting or laser-cutting method also enables minimizing material wastage. Thus, the dual-mode RFID device of the present subject matter is designed to be a sustainable one.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A dual-mode RFID device comprising:
   a RFID chip assembly comprising a pair of RFID chips, and
   an integrated dual-mode RFID strap comprising a conductive ring and a HF antenna coupled to the RFID chip assembly,
   wherein the integrated dual-mode RFID strap is coupled to a UHF antenna, and
   wherein the second RFID chip has a thickness at least 50% greater than the thickness of the first RFID chip.

2. The dual-mode RFID device of claim 1, wherein the integrated dual-mode RFID strap is coupled to the UHF antenna via conductive pads.

3. The dual-mode RFID device of claim 1, wherein the conductive ring comprises a UHF loop.

4. The dual-mode RFID device of claim 1, wherein the integrated dual-mode RFID strap is coupled to the UHF antenna without physical contact between the UHF antenna and the integrated dual-mode RFID strap.

5. The dual-mode RFID device of claim 1, wherein the RFID chip assembly is coupled on one side to the HF antenna and on the other side to the conductive ring.

6. The dual-mode RFID device of claim 1, wherein the HF antenna comprises a coil antenna.

7. The dual-mode RFID device of claim 1, wherein the conductive ring, the RFID chip assembly and the HF antenna are embedded on a single substrate.

8. The dual-mode RFID device of claim 7, wherein a portion of the conductive ring is defined as the HF antenna.

9. The dual-mode RFID device of claim 1, wherein the RFID chip assembly comprises an RFID coupling strap, wherein the strap comprises one or more RFID chips disposed thereon.

10. The dual-mode RFID device of claim 9, wherein the one or more RFID chips is a combination of a UHF RFID chip and an HF RFID chip.

11. The dual-mode RFID device of claim 1, wherein the integrated dual-mode RFID strap is capacitively coupled to the UHF antenna.

12. The dual-mode RFID device of claim 1, wherein the integrated dual-mode RFID strap is conductively coupled to the UHF antenna.

13. The dual-mode RFID device of claim 1, wherein the integrated dual-mode RFID strap is magnetically coupled to the UHF antenna.

14. The dual-mode RFID device of claim 1, wherein the UHF antenna is a slotted-loop antenna.

15. The dual-mode RFID device of claim 1, wherein the conductive ring is coupled, attached, or affixed to the RFID coupling strap via an adhesive material.

16. The dual-mode RFID device of claim 15, wherein the conductive ring is coupled to the dual-mode RFID strap via a pressure-sensitive adhesive.

17. A method for manufacturing a dual-mode RFID device, the method comprising:
   preparing an RFID chip assembly by securing a first RFID chip to a structure of the dual-mode RFID device by passing the structure through a thermode device a first time, and using the thermode to apply heat and pressure between the first RFID chip and the structure; and
   securing a second RFID chip to the structure by passing the structure through the thermode device a second time, and using the thermode to apply heat and pressure between the second RFID chip and the structure, with at least a portion of the first RFID chip positioned between the thermode and the structure.

18. The method of claim 17, wherein the second RFID chip has a thickness that is greater than a thickness of the first RFID chip.

19. The method of claim 18, wherein the second RFID chip has a thickness at least 50% greater than the thickness of the first RFID chip.

20. The method of claim 18, wherein the second RFID chip has a thickness of approximately 125 μm and the first RFID chip has a thickness of approximately 75 μm.

21. The method of claim 17, further comprising
   subjecting the first RFID chip to a first test after securing the first RFID chip to the structure,
   proceeding to secure the second RFID chip to the structure if the first RFID chip has passed the first test, or
   rejecting the dual-mode RFID device without securing the second RFID chip to the structure if the first RFID chip has failed the first test.

22. The method of claim 21, further comprising
   subjecting the second RFID chip to a second test after securing the second RFID chip to the structure,
   rejecting the dual-mode RFID device is the second RFID chip has failed the second test, or
   accepting the dual-mode RFID device when the second RFID chip has passed the second test.

23. The method of claim 22, further comprising
   subjecting the second RFID chip to a second test and subjecting the first RFID chip to a third test after securing the second RFID chip to the structure,
   rejecting the dual-mode RFID device when the second RFID chip has failed the second test and/or when the first RFID chip has failed the third test, or
   accepting the dual-mode RFID device when the second RFID chip has passed the second test and the first RFID chip has passed the third test.

* * * * *